UNITED STATES PATENT OFFICE.

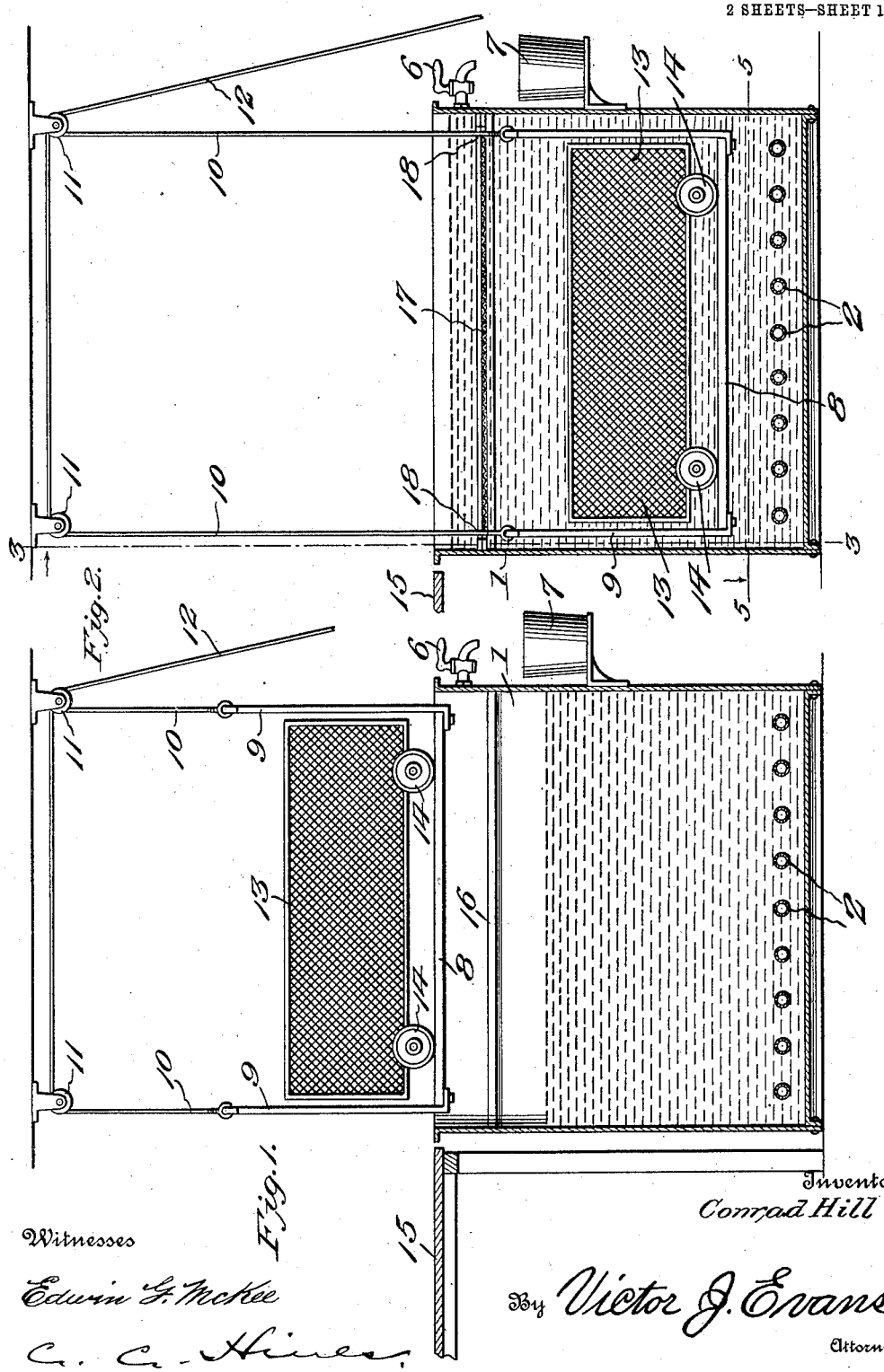

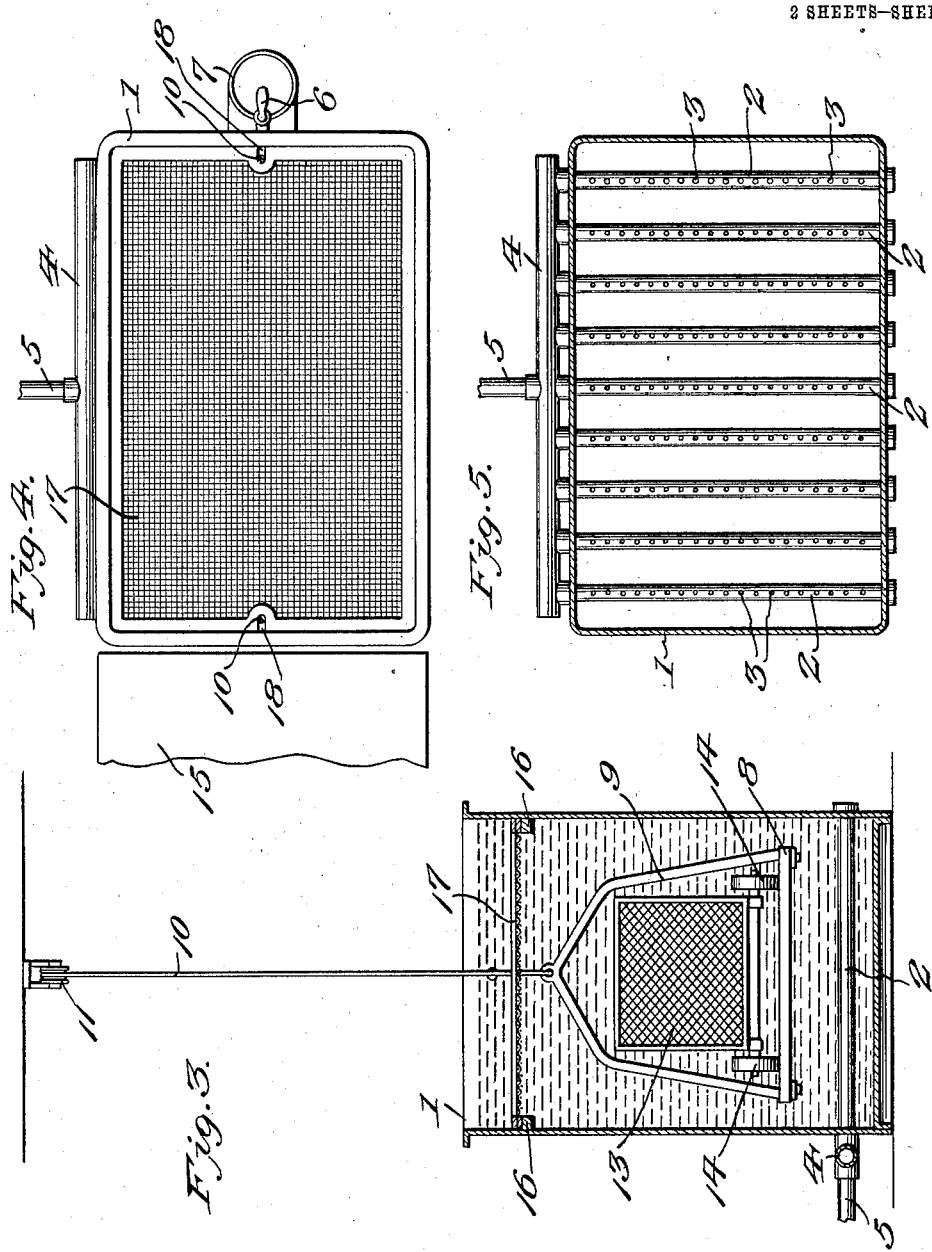

CONRAD HILL, OF SAN ANTONIO, TEXAS.

APPARATUS FOR SEPARATING WAX FROM PLANTS.

1,003,259.  Specification of Letters Patent.  Patented Sept. 12, 1911.

Application filed December 21, 1910. Serial No. 598,490.

*To all whom it may concern:*

Be it known that I, CONRAD HILL, a subject of the Emperor of Germany, residing at San Antonio, in the county of Bexar and State of Texas, have invented new and useful Improvements in Apparatus for Separating Wax from Plants, of which the following is a specification.

This invention relates to an apparatus for extracting wax from plants, and particularly to an apparatus for extracting the natural wax from the candelilla plant and other plants of the class *Myrica* (Lin.)

The object of the invention is to provide an apparatus by which the operation of extraction may be carried out in a rapid, convenient and efficient manner.

In the accompanying drawings, illustrating the invention: Figure 1 is a vertical longitudinal section through the extracting tank or vat, showing in elevation the basket in position to be lowered into the tank. Fig. 2 is a similar view, showing the basket and screen arranged within the vat for the extracting action. Fig. 3 is a vertical transverse section on the line 3—3 of Fig. 2. Fig. 4 is a top plan view of the apparatus with parts arranged as shown in Figs. 2 and 3. Fig. 5 is a horizontal section through the vat on the line 5—5 of Fig. 2.

In carrying my invention into practice, I employ an extracting tank or vat 1 open at the top and preferably of oblong rectangular form, said vat being constructed of wood, metal or other suitable material. Extending across the bottom of this vat is a row or series of steam injection pipes or nozzles 2 arranged in proximity to but disposed above the bottom of the vat, said pipes being provided at top with outlet orifices 3 for the discharge of jets of steam and connected at one end by a union pipe 4 communicating with a steam supply pipe 5 leading from a boiler or steam generator. Upon one end of the end walls of the vat, just below the top thereof, is arranged a faucet or valved outlet 6 for drawing off the extracted wax, which is discharged into a suitable receptacle 7. The tank is adapted for the reception of a false bottom or removable platform 8 to the ends of which are attached upwardly extending inverted U-shaped or yoked hangers 9 which are secured to the lower ends of suspending cables 10, whereby said false bottom or removable platform is adapted to be supported within the tank above the level of the steam pipes 2. The cables 10 pass over suitable supporting pulleys 11 and are connected with an operating rope or cable 12 through the medium of which the platform 8 may be conveniently raised and lowered.

On the platform 8 is adapted to be placed a foraminous or open-work basket or receptacle 13 of somewhat less length than the distance between the hangers and constructed of woven wire, perforated sheet metal or other suitable material. This basket is designed to receive the material to be treated and is supported upon wheels or rollers 14, whereby, when the platform 8 is elevated to a position level with the top of the tank, said basket may be rolled through the adjacent hanger 9 back or forth between the platform 8 and an exterior stationary platform 15, on which latter the basket may be supported while it is being filled with a charge of the material to be treated or emptied of the refuse material after treatment. The basket is preferably left open at the top for the ready insertion of the charge and removal of the refuse, as well as the discharge of the separated wax therefrom.

The tank is provided upon its interior, below the level of the faucet or valved outlet 6, with a flange or ledge extending around the same and adapted to support a removable screen 17, composed of a body of wire or other appropriate foraminous material and a frame rim of metal or other suitable material, said rim having its end portions formed with notches or recesses 18 for the passage of the cables 10 and to permit of the ready application and removal of said screen without interference from said cables.

In operation, the tank is filled with water to within twenty centimeters of its top or sufficiently to permit a corresponding displacement upon the submergence of the platform 8, the charged basket and the screen 17 in the water, so that the level of the water will be up to or slightly above that of the valved outlet 6. This water is then heated to boiling point by the injection of steam through the pipes 2, the jets of steam passing upwardly from the pipes and maintaining the body of water in an agitated condition. The basket with its charge of a proper quantity of the plant from which the wax is to be extracted is then placed upon the platform 8 and lowered with the latter into the vat until it is wholly submerged in the water and supported at a suitable elevation above the steam pipes, after which the screen 17 is placed in position upon the ledge or flange 16. The vegetable matter contained within the basket will thereupon be subjected to the heat of the boiling water and jets of steam from the pipe 2 and will be constantly agitated so that all particles thereof will be exposed, whereby the waxy matter contained therein will be boiled out or extracted and freed by the agitated water from the fibers of the plant. The wax thus separated will pass through the open top of the basket and the foraminous walls thereof and thence rise to the top of the body of water and discharge through the valved outlet 6 into the receptacle 7, from which it may be removed at necessary or convenient intervals. On its upward passage the wax flows through the screen 17, which separates therefrom all bits of wood and particles of refuse matter falling off the plants and prevents the passage of such refuse matter with the wax to the space in the top of the tank above the screen, so that the wax will be discharged in a highly purified state through the outlet 6. After all the wax has been separated from the charge of material in the basket and all the separated wax drained off, the screen is removed and cleansed, the false bottom and basket elevated, the basket rolled onto the platform, emptied of the refuse material and refilled with a fresh charge, and the parts again disposed within the vat for a repetition of the separating action above described. It will be understood, of course, that, in order to facilitate the separation of the wax, the fiber of the plant may be suitably broken or macerated before treatment, and that by the combined heating and agitative actions of the hot water and steam a thorough and rapid separation of all of the available wax from the plant is effected.

By means of this apparatus the material may be conveniently and expeditiously handled and all refuse material separated from the wax, whereby wax of a high degree of purity will be obtained.

Having thus described my invention, I claim:—

1. An apparatus for separating wax from plants comprising a tank open at its top and provided near its top with a discharge faucet, a coil arranged within the bottom of the tank for discharging jets of steam upwardly thereinto, a supporting ledge within the top of the tank below the level of the discharge faucet, a vertically movable platform provided with upright brackets at the ends thereof, at least one of said brackets being of openwork construction, a horizontal platform on the outside of the tank on a level with the top thereof and at the end of the tank adjacent said openwork bracket, hoisting means connected with said brackets for raising and lowering said platform out of and into the tank, a removable screen adapted to rest upon the vertically movable platform and to be run onto and off said platform and between the same and said outside platform through the openwork bracket.

2. An apparatus for extracting wax from plants comprising a tank or vat open at the top and provided near its top with a discharge faucet, a coil arranged in the bottom of the tank for discharging jets of steam upwardly thereinto, a platform adapted to be submerged in liquid in the tank above the level of the coil and to be raised from and lowered into the tank, upright brackets at the ends of the platform, one at least of said brackets being of openwork construction, hoisting cables connected with said brackets and extending upwardly therefrom, a supporting ledge in the tank below the discharge faucet, a perforate screen adapted to rest upon said ledge and having notches at its ends for the passage of the cables, and a wheeled perforate basket adapted to rest upon the platform and to be rolled onto and off the platform through said openwork bracket.

3. An apparatus for extracting wax from plants comprising a tank or vat open at the top and having a discharge faucet adjacent its top, a supporting ledge within the tank and below the level of said faucet, a coil within the bottom of the tank for discharging jets of steam upwardly into a body of liquid contained in the tank, a supporting platform at one end of the tank disposed on a level with the top of the tank, a movable platform adapted to be submerged in the liquid in the tank and to be lowered into and raised out of the tank, upright brackets connected with the ends of said platform, the bracket at the end of the movable platform adjacent said supporting platform being in the form of a yoke, hoisting cables connected with the brackets and extending upwardly from the tank, a screen adapted to rest upon the ledge and having notches at its ends for the passage of said cables, and a perforate wheeled car adapted to rest upon the movable platform and to be shifted when said platform is elevated between the same and supporting platform through the yoke hanger.

In testimony whereof I affix my signature in presence of two witnesses.

CONRAD HILL.

Witnesses:
J. G. GOINER,
J. C. ALLEN.

Copies of this patent may be obtained for five cents each, by addressing the "Commissioner of Patents, Washington, D. C."